US006685339B2

United States Patent
Daughtry et al.

(10) Patent No.: US 6,685,339 B2
(45) Date of Patent: Feb. 3, 2004

(54) SPARKLE LIGHT BULB WITH CONTROLLABLE MEMORY FUNCTION

(75) Inventors: Jerry Daughtry, Bushnell, FL (US); Douglas Ruthenberg, Spring Hill, FL (US)

(73) Assignee: Polaris Pool Systems, Inc., Vista, CA (US)

( * ) Notice: Subject to any disclaimer, the term of this patent is extended or adjusted under 35 U.S.C. 154(b) by 0 days.

(21) Appl. No.: 10/075,419

(22) Filed: Feb. 14, 2002

(65) Prior Publication Data

US 2003/0151917 A1 Aug. 14, 2003

(51) Int. Cl.[7] ............................................. F21V 23/04
(52) U.S. Cl. ........................ 362/251; 362/230; 362/231; 40/444; 40/581
(58) Field of Search ................................. 362/251, 230, 362/231; 40/444, 581

(56) References Cited

U.S. PATENT DOCUMENTS

| | | | | |
|---|---|---|---|---|
| 4,656,398 A | * | 4/1987 | Michael et al. ............. 315/293 |
| 5,374,876 A | * | 12/1994 | Horibata et al. ............ 315/313 |
| 5,416,679 A | * | 5/1995 | Ruskouski et al. ......... 362/240 |
| 5,526,236 A | * | 6/1996 | Burnes et al. ............... 362/20 |
| 5,806,965 A | * | 9/1998 | Deese ......................... 362/249 |
| 5,850,126 A | * | 12/1998 | Kanbar ..................... 315/200 A |
| 6,016,038 A | * | 1/2000 | Mueller et al. ............. 315/291 |
| 6,069,447 A | * | 5/2000 | Vilanilam et al. ............ 315/56 |
| 6,161,910 A | * | 12/2000 | Reisenauer et al. ......... 316/309 |
| 6,184,628 B1 | * | 2/2001 | Ruthenberg ............. 315/185 R |
| 6,220,722 B1 | * | 4/2001 | Begemann ................. 362/231 |
| 6,227,679 B1 | * | 5/2001 | Zhang et al. ............... 362/236 |
| 6,305,818 B1 | * | 10/2001 | Lebens et al. .............. 362/184 |
| 6,435,691 B1 | * | 8/2002 | Macey et al. ............... 362/101 |

\* cited by examiner

*Primary Examiner*—Alan Cariaso
*Assistant Examiner*—Jacob Y. Choi
(74) *Attorney, Agent, or Firm*—Dennis G. LaPointe; Mason Law, PA (57) ABSTRACT

The specification and drawings describe and show one embodiment of the present invention in the form of a sparkle light bulb with a plurality of different colored LED bulbs controlled by a circuit that selectively operates the LED bulbs in color wash mode or color dance mode. The controller circuit also has memory for further selectively locking the LED bulbs in a desired color pattern. The sparkle light housing has guides for aligning and guiding the lamp bulb into a multi-pin receptacle. It is emphasized that this abstract is provided to comply with the rules requiring an abstract that will allow a searcher or other reader to quickly ascertain the subject matter of the technical disclosure. It is submitted with the understanding that it will not be used to interpret or limit the scope of meaning of the claims. 37 CFR 1.72(b).

37 Claims, 5 Drawing Sheets

SPARKLE LIGHT BULB WITH CONTROLLABLE MEMORY FUNCTION

The invention relates to LED bulbs adapted for use in 12 volt AC applications. The bulbs can be retrofitted into pool lamps, spa lamps, ground lighting and similar lighting.

In applications where a light bulb with a screw-type base is being retrofitted or changed out, then an special adapter can be used to interconnect the sparkle light, which typically has a pin-type connector, to the screw-type lamp socket.

The LED bulb is a sparkle light in that it can change its color function to and from two distinct color shows, color dance and color wash and has a memory function which will also allow an operator to lock the bulb into a specific desired color pattern, which can be a single color or a single color mixture. The invention is therefore software driven with a micro-controller circuitry that provides this memory function so that a desired color which is terminated by opening the circuit for a predetermined time (typically about 4 to 10 seconds), can be resumed when the circuit is subsequently closed. On the other hand, if the user desires to change the last exhibited color from color wash to color dance or vice-versa, the operator need only open the circuit, typically for approximately one second or less than a pre-set time interval value such as 3 seconds, and then close the circuit.

Figure 1:
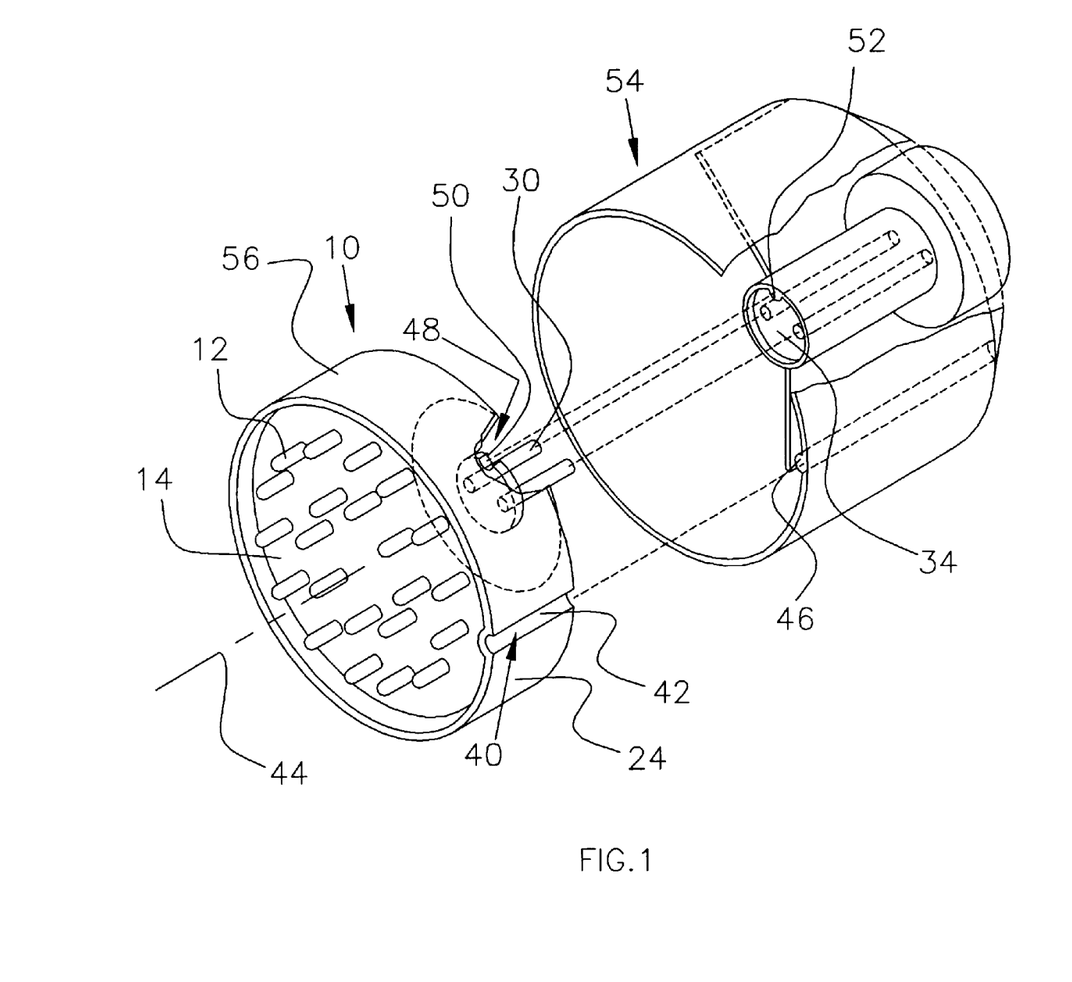
FIG. 1 is a perspective view of a typical embodiment contemplated by the present invention with the sparkle light bulb being plugged into a receptacle.
Figure 2A:
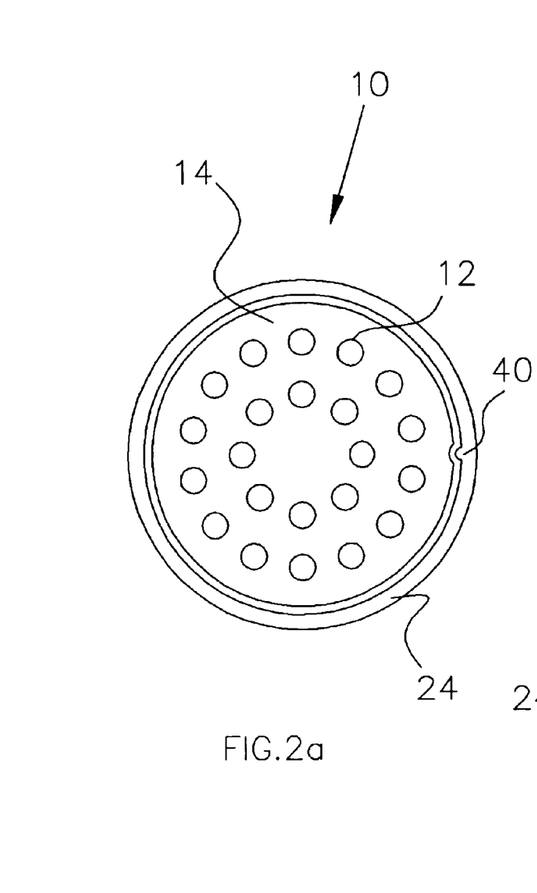
FIG. 2a is a front proximal view of the sparkle light bulb with a represent sampling of LED bulbs.

Referring now to the drawings, FIGS. 1 and 2a disclose one embodiment of the present invention, which is a sparkle light bulb, and is depicted generally as 10. The sparkle light bulb 10 has a plurality of different colored light-emitting diode (LED) bulbs 12 mounted in a predetermined spaced-apart arrangement on a circuit board 14.

Figure 3A:
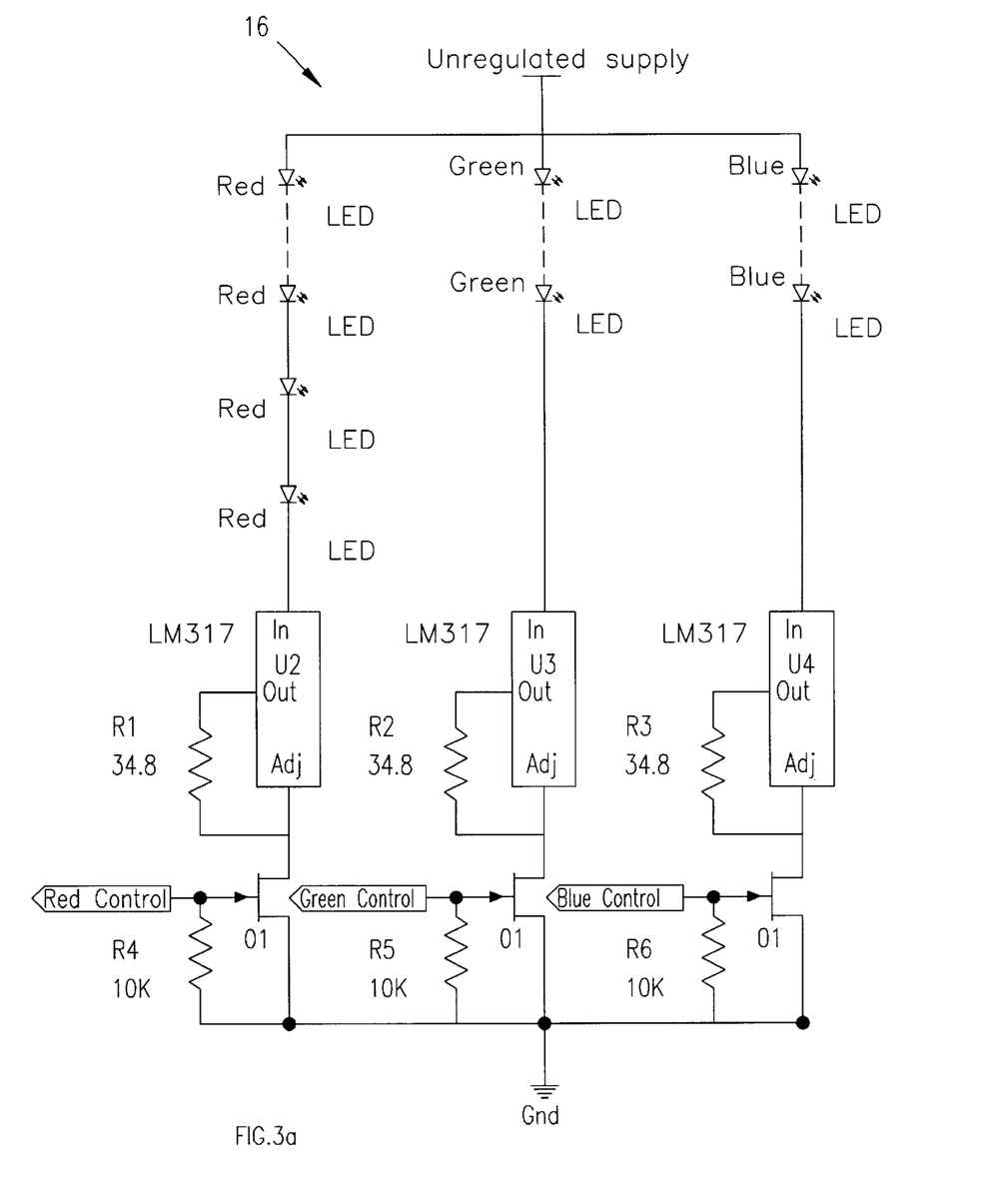
FIGS. 3a, 3b, and 3c are portions of a typical electrical schematic for the present invention.
Figure 3B:
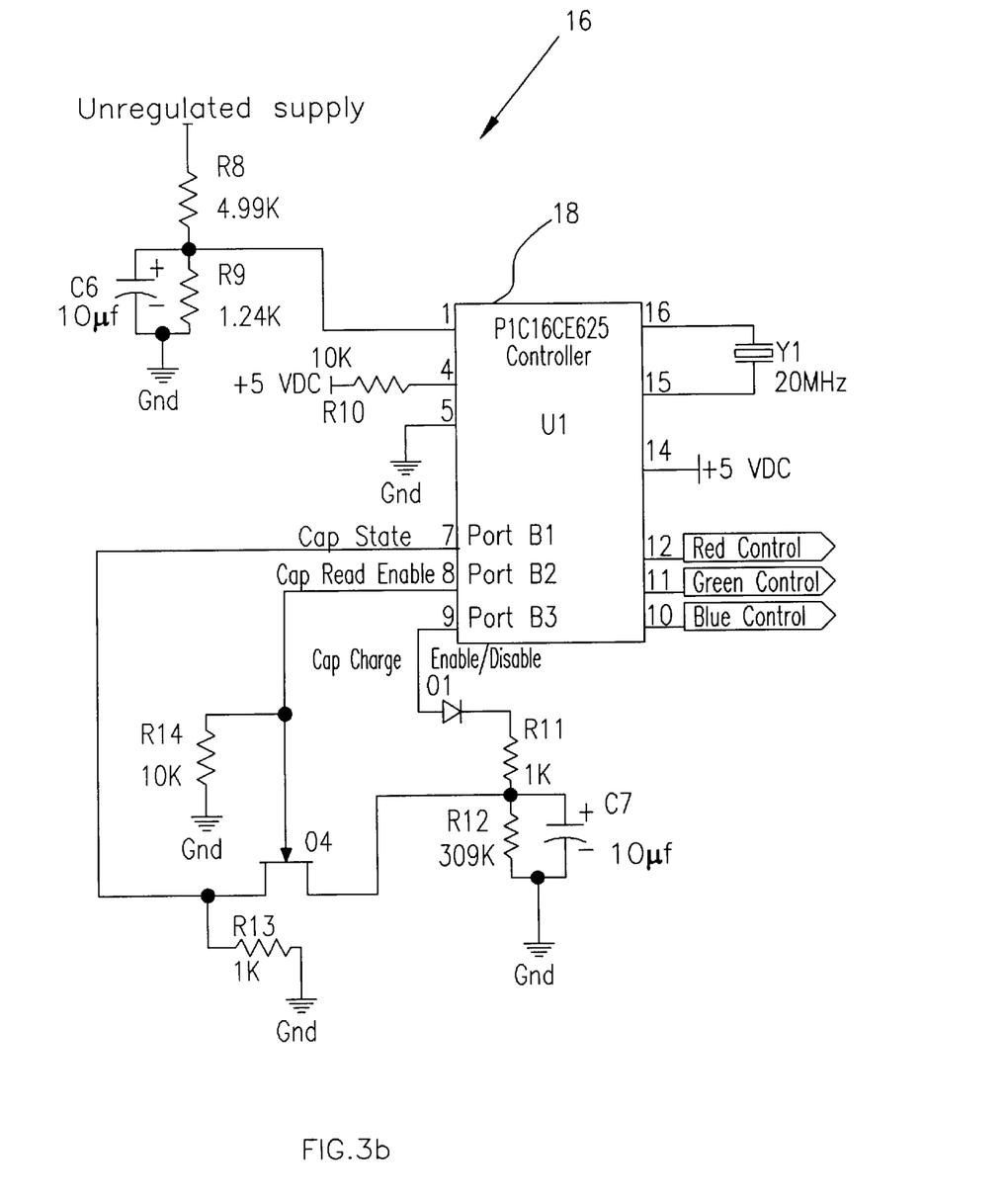
Figure 3C:
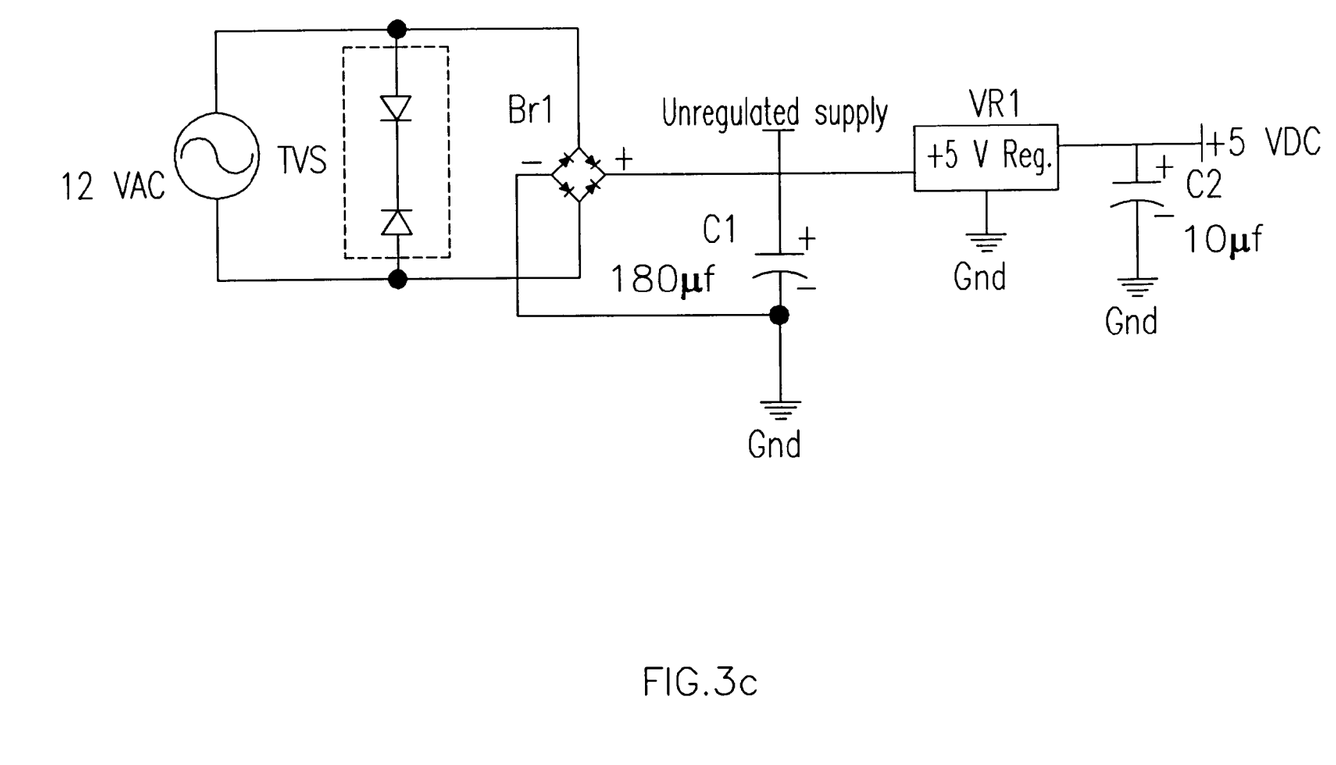

The invention 10 includes controller circuit means 16 in electrically operative communication with the plurality of different colored LED bulbs 12 for selectively operating the plurality of different colored LED bulbs 12 in one of color wash mode and color dance mode. The controller circuit means 16 further including memory means 18 for further selectively locking the plurality of different colored LED bulbs 12 in a desired color pattern. FIGS. 3a, 3b and 3c represent in combination a typical electrical schematic of a circuitry useful for operating the inventive sparkle light bulb 10.

The controller circuit means 16, including the memory means 18, are in electrically operative communication with means 20 for electrically connecting the sparkle light bulb 10 to a 12 VAC power source 22.

The anticipated typical application for this invention is in devices such as ground landscape lighting, pool lights, spa lights, fountain lights and other similar applications. These applications usually have power sources which include a transformer to reduce the power from the standard 110 volt circuit to a 12 volt-AC circuit. The incoming power is rectified by the invention circuitry to a direct current (DC) circuit for operating LED light bulbs.

The invention 10, including circuit board 14, bulbs 12 and the associated circuitry 16 and 18 are housed in a light bulb housing 24 having an open proximal end 26 from which the plurality of different colored LED bulbs 12 are exposed for emitting generated light and a closed distal end 28, at which the means 20 for electrically connecting the sparkle light bulb 10 to the 12 VAC power source 22 is located.

In a preferred embodiment, a combination of LED bulbs 12 which provides entertaining and esthetic color patterns is a combination of red, green and blue LED bulbs 12. Any number and combination of red, green and blue (RGB) bulbs would work depending on the size of the light bulb and the amount of lumens desired. For example, in most applications, the combination of red, green and blue LED bulbs could be combined in a respective ratio of X:Y:Z, where X is 1–20, Y is 1–20 and Z is 1–20. Where a larger number of red LED bulbs than green and blue LED bulbs seem to provide for better light effects, it is recommended that the ratio of red to green to blue LED bulbs be combined in a respective ratio of 5:3:3 or 4:2:2.

The means 20 for electrically connecting the sparkle light bulb 10 to a 12 VAC power source 22 is typically a multi-pin plug connector, such as a bi-pin plug connector that can be plugged into a bi-pin connector receptacle manufactured by Molex® Corporation.

The controller circuit's processor or memory chip 18 is programmed so that when an operator of the sparkle light bulb 10 turns the power off for a pre-set time interval and then immediately turns the power back on, the mode will change to color dance mode if the previous mode before turning off the power was color wash mode and the mode will change to color wash mode if the previous mode before turning off the power was color dance mode. In a preferred embodiment, the pre-set time interval is typically about one second or generally less than three seconds. That is, the time interval is relatively momentary.

The controller circuit's processor 18 is also programmed so that when an operator of the sparkle light bulb 10 turns the power off for a pre-set time interval, the desired color pattern of the plurality of different colored LED bulbs can be locked in memory so that when the power is subsequently turned on, the desired color pattern is displayed and remains displayed while the power is on.

It is preferred that the this latter operating characteristic that the pre-set time interval be greater than 3 seconds, such as for 4–6 seconds or more.

The controller circuit's processor 18 is further programmed so that when the operator of the sparkle light bulb 10 turns the power off for a second pre-set time interval when the plurality of different colored LED bulbs are locked in the desired color pattern and then immediately turns the power back on, the mode will change to one of the color wash mode and the color dance mode, depending on which was the last mode (wash or dance) to be operating. If wash mode was the last mode, then the change will be to dance mode. The second pre-set time interval is, as previously discussed above, preferred to be less than 3 seconds.

Figure 2B:
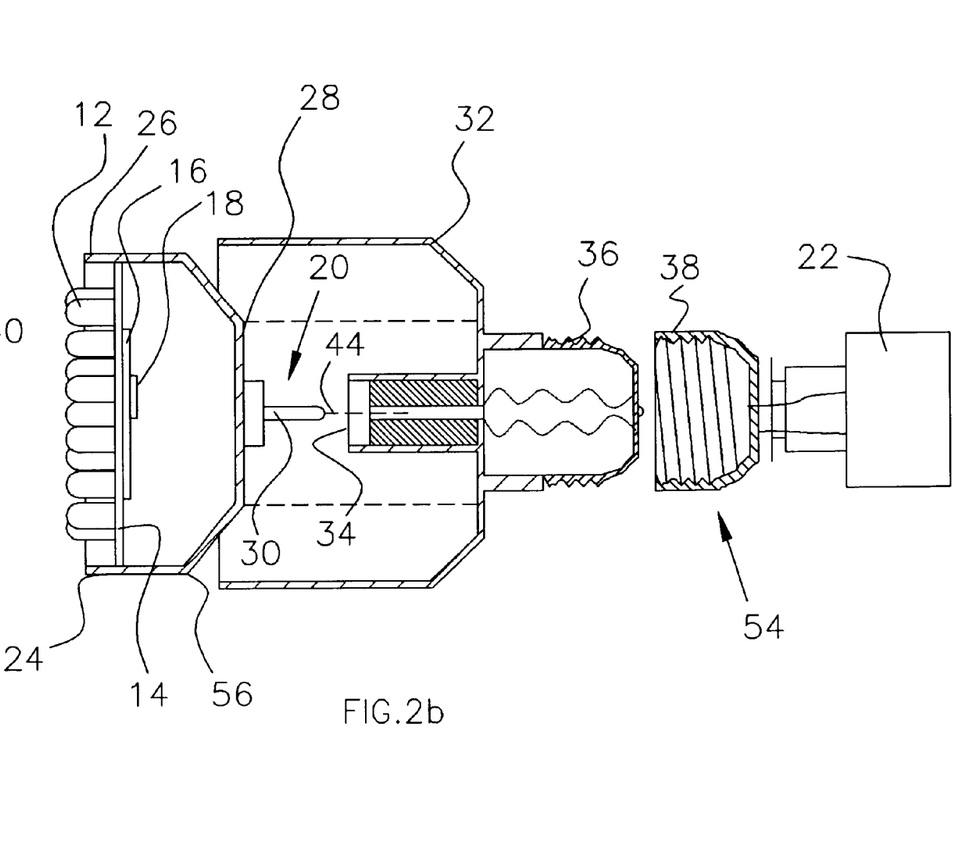
FIG. 2b is a depiction of the present invention being used in another embodiment with a special adapter for connecting to a screw-type lamp socket.

When the ultimate installation of the sparkle light bulb 10 is in a receptacle which is a screw-type lamp socket 38 as shown in FIG. 2b, a light housing adapter 32 may be used that adapts from the multi-pin plug connector 30 to a screw-type connector (base portion) 36. The light housing adapter 32 has a multi-pin connector 34 for connecting the multi-pin plug connector 30, and has a screw-type base portion 36 in electrical communication with the multi-pin connector 34.

The light bulb housing 24 can optionally include means 40 for guiding and aligning the sparkle light bulb 10 into a receptacle 54 for the 12 VAC power source 22. The means 40 for guiding and aligning the sparkle light bulb 10 into the receptacle 54 for the 12 VAC power source 22 can be made in a variety of ways; however, a logical way is simply to provide for a groove portion 42 in an outside surface 54 of the light bulb housing 24 near the proximal end 26 of the light bulb housing 24, with the groove portion 42 running parallel to an axis 44 of the sparkle light bulb 10. The groove portion 42 is generally adapted for mating with a ridge portion 46 in the receptacle 54 for the 12 VAC power source 22.

The light bulb housing 24 may also include means 48 for guiding and aligning the means 20 for electrically connecting the sparkle light bulb 10 into a receptacle 54 for the 12 VAC power source 22. The means 48 for guiding and aligning the means 20 for electrically connecting the sparkle light bulb 10 into the receptacle 54 for the 12 VAC power source 22 is, as above, also recommended to be another groove portion 50 in the outside surface 56 of the light bulb housing 24 near the closed distal end 28 of the light bulb housing 24. This groove portion 50 also typically runs parallel to the axis 44 of the sparkle light bulb 10 and is adapted for mating with another ridge portion 52 in the receptacle 54 for the 12 VAC power source 22.

When both the means 40 for guiding and aligning the sparkle light bulb into the receptacle 54 for the 12 VAC power source 22 and the means 48 for guiding and aligning the means 20 for electrically connecting the sparkle light bulb 10 into the receptacle 54 for the 12 VAC power source 22 are incorporated into the invention, it is preferable that both means, even if grooves are used, be oriented about 90 degrees from each other.

Preferred Software Algorithm

The following describes a preferred software algorithm used in conjunction with the necessary hardware to perform the following functions:

1. Determine if the elapsed time, from power off to power on, of an embedded, RGB (Red, Green, Blue), LED device is greater than or less than a predetermined value. In a preferred embodiment, this value is chosen to be 3 seconds, but could be adjusted to make a pass-fail determination for other elapsed times as well.

The predetermined time value is set by a simple R-C time constant. The software algorithm and interface hardware necessary to control and evaluate the state of the simple R-C circuit are detailed below.

2. Save in non-volatile memory the discrete, RGB intensity values for an embedded, RGB, LED device at the moment power is turned off.

State 1: Power-Off/Power-On delay Evaluation.
 a. Immediately disable capacitor charge circuitry on power up. Any charge on the capacitor should be due to a previous power cycle and not to the current power cycle.
 b. Enable circuitry to read the existing charge on the capacitor. The capacitor must be isolated from all interface circuitry while power is off. All current flow from the capacitor must be limited to the R-C circuit alone at this time.
 c. Read capacitor charge and store state in a defined variable, Cap_State, in software. The power-on time is now known.

State 2: Set Hardware & Software for Continuous Run operation.
 a. Isolate the timing capacitor from all connections except a power source and discharge resistor.
 b. Enable the power source to supply a continuous charge on the timing capacitor until power is again turned off.
 c. Enable controller's interrupts. The microcontroller's normal program flow is interrupted when the supply voltage drops below a software specified value.
 d. Retrieve RGB intensity data and mode saved to non-volatile memory at the last power down.

State 3: Mode Determination for embedded, RGB, LED device.
 a. Evaluate the state of the variable Cap_State. A Cap_State=1 indicates a Power/Off-Power/On sequence has occurred in less than a pre-set time interval value, for example, 3 seconds. If the retrieved mode was "A" and Cap_State=1, then mode "B" will be run. Likewise, mode "A" will be selected if mode "B" was the retrieved mode. A Cap_State=0 indicates a Power/Off-Power/On sequence of greater than the pre-set time interval value, that is, in the current example, greater than 3 seconds. The software loads the discrete RGB values, saved from the previous power down, and sets each LED to the retrieved intensity level and holds until power is turned off.

Interrupt State: Saves the state of the embedded, RGB, LED device at the time power is switched off.

When power to the device is switched off, the supplied voltage crosses a predefined threshold set in software.

The above defined software execution is halted and the current state of the system is saved to non-volatile memory.

For example, a user who wants to toggle between color dance and color wash need only turn the power off for a short moment, such as one second, and then immediately turn the power back on. Turning the power on and off sequentially as such will cycle the sparkle light between color dance and color wash modes.

To stop at a particular color, whether in the color dance or color wash mode, one need only turn the power off for the longer interval such as 6 seconds and when the bulb is turned back on, it will be locked in the last color that was visible. To resume color dance or color wash mode, the operator need only turn the power off for about one second and turn the power back on to resume the color dance or color wash mode. Of course, if the bulb resumes in the color wash mode and the operator prefers the color dance mode, the operator need only turn the power off again for about one second and then toggle the switch back on, and similarly to change from the color dance mode to the color wash mode.

It should be understood that the preceding is merely a detailed description given as an example of the implementation of two selective modes of operation. It should be noted that more selective modes of operation are possible with the claimed circuitry and firmware ("memory means"). The preceding description, therefore, is not meant to limit the scope of the invention. Rather, the scope of the invention is to be determined only by the appended claims and their equivalents.

Now that the invention has been described,

What is claimed is:

1. A sparkle light bulb comprising:
 a plurality of different colored light-emitting diode (LED) bulbs mounted in a predetermined spaced-apart arrangement on a circuit board;
 controller circuit means in electrically operative communication with the plurality of different colored LED bulbs for selectively operating the plurality of different colored LED bulbs, wherein the selective operation functions in such a way as to allow the plurality of different colored LED bulbs to be locked at any desired point in a spectrum of colors resulting from pre-programmed, dynamic color cyclic patterns produced by the plurality of the different colored LED bulbs, by a single power off/power on cycle for selection;

the controller circuit means further including memory means for saving individual intensity settings for each color of the plurality of different colored LED bulbs, wherein the intensity settings for each color of the plurality of different colored LED bulbs is saved to memory at the instant power is removed to allow for the locking of the plurality of different colored LED bulbs at the desired point in the spectrum of colors resulting from the pre-programmed, dynamic color cyclic patterns;

the controller circuit means, including the memory means, being in electrically operative communication with means for electrically connecting the sparkle light bulb to a 12 VAC power source; and a light bulb housing having an open proximal end from which the plurality of different colored LED bulbs are exposed for emitting generated light and a closed distal end, at which the means for electrically connecting the sparkle light bulb to the 12 VAC power source is located, wherein the controller circuit means is programmed so that when an operator of the sparkle light bulb turns the power off and then turns the power back on within a pre-set time interval, the color pattern produced at the desired point in the spectrum of colors by the saved individual intensity of each color at the time power was removed, is displayed and held until another power off/power on cycle occurs, and wherein the controller circuit means is further programmed so that when the operator of the sparkle light bulb turns the power off and then subsequently turns the power back on after the expiration of the pre-set time interval, the sparkle bulb will reset when powered on and restart the pre-programmed, dynamic color cyclic patterns.

2. The sparkle light bulb according to claim 1, wherein the plurality of different colored LED bulbs includes a combination of red, green and blue LED bulbs.

3. The sparkle light bulb according to claim 1, wherein the means for electrically connecting the sparkle light bulb to a 12 VAC power source is a multi-pin plug connector.

4. The sparkle light according to claim 3, wherein the multi-pin connector is a bi-pin plug connector.

5. The sparkle light bulb according to claim 3, further comprising:

a light housing adapter, the light housing adapter having a multi-pin connector for connecting the multi-pin plug connector; and the light housing adapter having a screw-type base portion in electrical communication with the multi-pin connector, the screw-type base portion for connecting into a screw-type lamp socket.

6. The sparkle light bulb according to claim 3, wherein the light bulb housing includes means for guiding and aligning the sparkle light bulb into a receptacle for the 12 VAC power source.

7. The sparkle light bulb according to claim 6, wherein the means for guiding and aligning the sparkle light bulb into the receptacle for the 12 VAC power source is a groove portion in an outside surface of the light bulb housing near the proximal end of the light bulb housing, the groove portion running parallel to an axis of the sparkle light bulb, the groove portion further being adapted for mating with a ridge portion in the receptacle for the 12 VAC power source.

8. The sparkle light bulb according to claim 3, wherein the light bulb housing includes means for guiding and aligning the means for electrically connecting the sparkle light bulb into a receptacle for the 12 VAC power source.

9. The sparkle light bulb according to claim 8, wherein the means for guiding and aligning the means for electrically connecting the sparkle light bulb into the receptacle for the 12 VAC power source is a groove portion in an outside surface of the light bulb housing near the closed distal end of the light bulb housing, the groove portion running parallel to an axis of the sparkle light bulb, the groove portion further being adapted for mating with a ridge portion in the receptacle for the 12 VAC power source.

10. The sparkle light bulb according to claim 6, wherein the light bulb housing includes means for guiding and aligning the means for electrically connecting the sparkle light bulb into the receptacle for the 12 VAC power source.

11. The sparkle light bulb according to claim 10, wherein the means for guiding and aligning the sparkle light bulb into the receptacle for the 12 VAC power source is a groove portion in an outside surface of the light bulb housing near the proximal end of the light bulb housing, the groove portion running parallel to an axis of the sparkle light bulb, the groove portion further being adapted for mating with a ridge portion in the receptacle for the 12 VAC power source, and wherein the means for guiding and aligning the means for electrically connecting the sparkle light bulb into the receptacle for the 12 VAC power source is a second groove portion in the outside surface of the light bulb housing near the closed distal end of the light bulb housing, the second groove portion running parallel to the axis of the sparkle light bulb, the groove portion further being adapted for mating with another ridge portion in the receptacle for the 12 VAC power source.

12. The sparkle light bulb according to claim 10, wherein the means for guiding and aligning the sparkle light bulb into the receptacle for the 12 VAC power source and the means for guiding and aligning the means for electrically connecting the sparkle light bulb into the receptacle for the 12 VAC power source are oriented about 90 degrees from each other.

13. A sparkle light bulb comprising:

a plurality of different colored light-emitting diode (LED) bulbs mounted in a predetermined spaced-apart arrangement on a circuit board;

controller circuit means in electrically operative communication with the plurality of different colored LED bulbs for selectively operating the plurality of different colored LED bulbs, wherein the selective operation functions in such a way as to allow the plurality of different colored LED bulbs to be locked at any desired point in a spectrum of colors resulting from pre-programmed, dynamic color cyclic patterns produced by the plurality of the different colored LED bulbs, by a single power off/power on cycle for selection;

the controller circuit means further including memory means for saving individual intensity settings for each color of the plurality of different colored LED bulbs, wherein the intensity settings for each color of the plurality of different colored LED bulbs is saved to memory at the instant power is removed to allow for the locking of the plurality of different colored LED bulbs at the desired point in the spectrum of colors resulting from the pre-programmed, dynamic color cyclic patterns;

the controller circuit means, including the memory means, being in electrically operative communication with means for electrically connecting the sparkle light bulb to a 12 VAC power source; and a light bulb housing having an open proximal end from which the plurality of different colored LED bulbs are exposed for emitting generated light and a closed distal end, at which the means for electrically connecting the sparkle light bulb to the 12 VAC power source is located, wherein the controller circuit means is programmed so that when an operator of the sparkle light bulb turns the power off and then turns the power back on within a pre-set time interval, the color pattern produced at the desired point in the spectrum of colors by the saved individual intensity of each color at the time power was removed, is displayed and held until another power off/power on cycle occurs, and wherein the controller circuit means is further programmed so that when the operator of the sparkle light bulb turns the power off and then subsequently turns the power back on after the expiration of the pre-set time interval, the sparkle bulb will reset when powered on and restart the pre-programmed, dynamic color cyclic patterns;

the light bulb housing including means for guiding and aligning the sparkle light bulb into a receptacle for the 12 VAC power source; and the means for guiding and aligning the sparkle light bulb into the receptacle for the 12 VAC power source being a groove portion in an outside surface of the light bulb housing near the proximal end of the light bulb housing, the groove portion running parallel to an axis of the sparkle light bulb, the groove portion further being formed for mating with a ridge portion in the receptacle for the 12 VAC power source.

14. The sparkle light bulb according to claim 13, wherein the plurality of different colored LED bulbs includes a combination of red, green and blue LED bulbs.

15. The sparkle light bulb according to claim 13, wherein the means for electrically connecting the sparkle light bulb to a 12 VAC power source is a multi-pin plug connector.

16. The sparkle light according to claim 15, wherein the multi-pin connector is a bi-pin plug connector.

17. The sparkle light bulb according to claim 15, further comprising:

a light housing adapter, the light housing adapter having a multi-pin connector for connecting the multi-pin plug connector; and the light housing adapter having a screw-type base portion in electrical communication with the multi-pin connector, the screw-type base portion for connecting into a screw-type lamp socket.

18. The sparkle light bulb according to claim 15, wherein the light bulb housing includes means for guiding and aligning the means for electrically connecting the sparkle light bulb into the receptacle for the 12 VAC power source.

19. The sparkle light bulb according to claim 18, wherein the means for guiding and aligning the means for electrically connecting the sparkle light bulb into the receptacle for the 12 VAC power source is a groove portion in an outside surface of the light bulb housing near the closed distal end of the light bulb housing, the groove portion running parallel to an axis of the sparkle light bulb, the groove portion further being adapted for mating with a ridge portion in the receptacle for the 12 VAC power source.

20. The sparkle light bulb according to claim 13, wherein the light bulb housing includes means for guiding and aligning the means for electrically connecting the sparkle light bulb into the receptacle for the 12 VAC power source.

21. The sparkle light bulb according to claim 20, wherein the means for guiding and aligning the sparkle light bulb into the receptacle for the 12 VAC power source is a groove portion in an outside surface of the light bulb housing near the proximal end of the light bulb housing, the groove portion running parallel to an axis of the sparkle light bulb, the groove portion further being adapted for mating with a ridge portion in the receptacle for the 12 VAC power source, and wherein the means for guiding and aligning the means for electrically connecting the sparkle light bulb into the receptacle for the 12 VAC power source is a second groove portion in the outside surface of the light bulb housing near the closed distal end of the light bulb housing, the second groove portion running parallel to the axis of the sparkle light bulb, the groove portion further being adapted for mating with another ridge portion in the receptacle for the 12 VAC power source.

22. The sparkle light bulb according to claim 20, wherein the means for guiding and aligning the sparkle light bulb into the receptacle for the 12 VAC power source and the means for guiding and aligning the means for electrically connecting the sparkle light bulb into the receptacle for the 12 VAC power source are oriented about 90 degrees from each other.

23. A sparkle light bulb comprising:

a plurality of different colored light-emitting diode (LED) bulbs mounted in a predetermined spaced-apart arrangement on a circuit board;

controller circuit means in electrically operative communication with the plurality of different colored LED bulbs for selectively operating the plurality of different colored LED bulbs, wherein the selective operation functions in such a way as to allow the plurality of different colored LED bulbs to be locked at any desired point in a spectrum of colors resulting from pre-programmed, dynamic color cyclic patterns produced by the plurality of the different colored LED bulbs, by a single power off/power on cycle for selection;

the controller circuit means further including memory means for saving individual intensity settings for each color of the plurality of different colored LED bulbs, wherein the intensity settings for each color of the plurality of different colored LED bulbs is saved to memory at the instant power is removed to allow for the locking of the plurality of different colored LED bulbs at the desired point in the spectrum of colors resulting from the pre-programmed, dynamic color cyclic patterns;

the controller circuit means, including the memory means, being in electrically operative communication with means for electrically connecting the sparkle light bulb to a 12 VAC power source; and a light bulb housing having an open proximal end from which the plurality of different colored LED bulbs are exposed for emitting generated light and a closed distal end, at which the means for electrically connecting the sparkle light bulb to the 12 VAC power source is located, wherein the controller circuit means is programmed so that when an operator of the sparkle light bulb turns the power off and then turns the power back on within a pre-set time interval, the color pattern produced at the desired point in the spectrum of colors by the saved individual intensity of each color at the time power was removed, is displayed and held until another power off/power on cycle occurs, and wherein the controller circuit means is further programmed so that when the operator of the sparkle light bulb turns the power off and then subsequently turns the power back on after the expiration of the pre-set time interval, the sparkle bulb will reset when powered on and restart the pre-programmed, dynamic color cyclic patterns;

the light bulb housing including means for guiding and aligning the means for electrically connecting the sparkle light bulb into a receptacle for the 12 VAC power source; and the means for guiding and aligning the means for electrically connecting the sparkle light bulb into the receptacle for the 12 VAC power source being a groove portion in an outside surface of the light bulb housing near the closed distal end of the light bulb housing, the groove portion running parallel to an axis of the sparkle light bulb, the groove portion further being adapted for mating with a ridge portion in the receptacle for the 12 VAC power source.

24. The sparkle light bulb according to claim 23, wherein the plurality of different colored LED bulbs includes a combination of red, green and blue LED bulbs.

25. The sparkle light bulb according to claim 23, wherein the means for electrically connecting the sparkle light bulb to the 12 VAC power source is a multi-pin plug connector.

26. The sparkle light according to claim 25, wherein the multi-pin connector is a bi-pin plug connector.

27. The sparkle light bulb according to claim 25, further comprising:

a light housing adapter, the light housing adapter having a multi-pin connector for connecting the multi-pin plug connector; and the light housing adapter having a screw-type base portion in electrical communication with the multi-pin connector, the screw-type base portion for connecting into a screw-type lamp socket.

28. The sparkle light bulb according to claim 25, wherein the light bulb housing includes means for guiding and aligning the sparkle light bulb into the receptacle for the 12 VAC power source.

29. The sparkle light bulb according to claim 28, wherein the means for guiding and aligning the sparkle light bulb into the receptacle for the 12 VAC power source is a groove portion in an outside surface of the light bulb housing near the proximal end of the light bulb housing, the groove portion running parallel to an axis of the sparkle light bulb, the groove portion further being adapted for mating with a ridge portion in the receptacle for the 12 VAC power source.

30. The sparkle light bulb according to claim 28, wherein the means for guiding and aligning the sparkle light bulb into the receptacle for the 12 VAC power source is a groove portion in an outside surface of the light bulb housing near the proximal end of the light bulb housing, the groove portion running parallel to an axis of the sparkle light bulb, the groove portion further being adapted for mating with a ridge portion in the receptacle for the 12 VAC power source.

31. The sparkle light bulb according to claim 28, wherein the means for guiding and aligning the sparkle light bulb into the receptacle for the 12 VAC power source and the means for guiding and aligning the means for electrically connecting the sparkle light bulb into the receptacle for the 12 VAC power source are oriented about 90 degrees from each other.

32. A sparkle light bulb comprising:

a plurality of different colored light-emitting diode (LED) bulbs mounted in a predetermined spaced-apart arrangement on a circuit board;

controller circuit means in electrically operative communication with the plurality of different colored LED bulbs for selectively operating the plurality of different colored LED bulbs, wherein the selective operation functions in such a way as to allow the plurality of different colored LED bulbs to be locked at any desired point in a spectrum of colors resulting from pre-programmed, dynamic color cyclic patterns produced by the plurality of the different colored LED bulbs, by a single power off/power on cycle for selection;

the controller circuit means further including memory means for saving individual intensity settings for each color of the plurality of different colored LED bulbs, wherein the intensity settings for each color of the plurality of different colored LED bulbs is saved to memory at the instant power is removed to allow for the locking of the plurality of different colored LED bulbs at the desired point in the spectrum of colors resulting from the pre-programmed, dynamic color cyclic patterns;

the controller circuit means, including the memory means, being in electrically operative communication with means for electrically connecting the sparkle light bulb to a 12 VAC power source; and a light bulb housing having an open proximal end from which the plurality of different colored LED bulbs are exposed for emitting generated light and a closed distal end, at which the means for electrically connecting the sparkle light bulb to the 12 VAC power source is located, wherein the controller circuit means is programmed so that when an operator of the sparkle light bulb turns the power off and then turns the power back on within a pre-set time interval, the color pattern produced at the desired point in the spectrum of colors by the saved individual intensity of each color at the time power was removed, is displayed and held until another power off/power on cycle occurs, and wherein the controller circuit means is further programmed so that when the operator of the sparkle light bulb turns the power off and then subsequently turns the power back on after the expiration of the pre-set time interval, the sparkle bulb will reset when powered on and restart the pre-programmed, dynamic color cyclic patterns;

the light bulb housing includes means for guiding and aligning the sparkle light bulb into a receptacle for the 12 VAC power source;

the light bulb housing including means for guiding and aligning the means for electrically connecting the sparkle light bulb into the receptacle for the 12 VAC power source;

the means for guiding and aligning the sparkle light bulb into the receptacle for the 12 VAC power source being a groove portion in an outside surface of the light bulb housing near the proximal end of the light bulb housing, the groove portion running parallel to an axis of the sparkle light bulb, the groove portion further being formed for mating with a ridge portion in the receptacle for the 12 VAC power source; and the means for guiding and aligning the means for electrically connecting the sparkle light bulb into the receptacle for the 12 VAC power source being a second groove portion in the outside surface of the light bulb housing near the closed distal end of the light bulb housing, the second groove portion running parallel to the axis of the sparkle light bulb, the groove portion further being formed for mating with another ridge portion in the receptacle for the 12 VAC power source.

33. The sparkle light bulb according to claim 32, wherein the plurality of different colored LED bulbs includes a combination of red, green and blue LED bulbs.

34. The sparkle light bulb according to claim 32, wherein the means for electrically connecting the sparkle light bulb to a 12 VAC power source is a multi-pin plug connector.

35. The sparkle light according to claim 34, wherein the multi-pin connector is a bi-pin plug connector.

36. The sparkle light bulb according to claim 34, further comprising:

a light housing adapter, the light housing adapter having a multi-pin connector for connecting the multi-pin plug connector; and the light housing adapter having a screw-type base portion in electrical communication with the multi-pin connector, the screw-type base portion for connecting into a screw-type lamp socket.

37. The sparkle light bulb according to claim 32, wherein the means for guiding and aligning the sparkle light bulb into the receptacle for the 12 VAC power source and the means for guiding and aligning the means for electrically connecting the sparkle light bulb into the receptacle for the 12 VAC power source are oriented about 90 degrees from each other.

* * * * *